(12) United States Patent
Peng et al.

(10) Patent No.: US 11,910,780 B2
(45) Date of Patent: Feb. 27, 2024

(54) PET GROOMING MACHINE AND A METHOD FOR PET HAIR GROOMING

(71) Applicant: SUZHOU VACS ELECTRICAL CO., LTD., Suzhou (CN)

(72) Inventors: Jinsong Peng, Suzhou (CN); Yu Liang, Suzhou (CN)

(73) Assignee: SUZHOU VACS ELECTRICAL CO., LTD., Suzhou (CN)

( * ) Notice: Subject to any disclaimer, the term of this patent is extended or adjusted under 35 U.S.C. 154(b) by 0 days.

(21) Appl. No.: 18/227,894

(22) Filed: Jul. 28, 2023

(65) Prior Publication Data

US 2024/0032505 A1    Feb. 1, 2024

(30) Foreign Application Priority Data

Jul. 29, 2022 (CN) .......................... 202221985511.X
Aug. 4, 2022 (CN) .......................... 202210933180.3
Jul. 17, 2023 (CN) .......................... 202310874839.7

(51) Int. Cl.
*A01K 13/00* (2006.01)
*A45D 20/12* (2006.01)
(Continued)

(52) U.S. Cl.
CPC ............ *A01K 13/001* (2013.01); *A45D 20/12* (2013.01); *A47L 5/365* (2013.01); *A47L 7/0009* (2013.01);
(Continued)

(58) Field of Classification Search
CPC .................. A01K 13/001; A45D 20/12; A45D 2020/128; A47L 5/265; A47L 7/0009; A47L 7/04
See application file for complete search history.

(56) References Cited

U.S. PATENT DOCUMENTS

D257,904 S  *  1/1981  Hamm, Jr. ..................... D28/12
4,630,329 A  *  12/1986  Shores ................. A01K 13/002
                                                            15/352
(Continued)

FOREIGN PATENT DOCUMENTS

CN     114667946 A  *  6/2022    ............. A01K 13/00
KR   20140000382 U  *  1/2014    ................ F26B 9/06
KR   20170101631 A  *  9/2017    ............. A01K 13/00

*Primary Examiner* — Ebony E Evans
(74) *Attorney, Agent, or Firm* — H&I PARTNERS; C. Andrew Im; Chai Im

(57) ABSTRACT

A pet grooming machine and a method for pet hair grooming is provided. The pet grooming machine includes a blower having a blower air-inlet, a motor unit, a blower air-outlet, and an air channel, a tank unit having a tank, a tank air-inlet, a filter, and an air-outlet. The blower and tank unit can be in either separated configuration or combined configuration. In separated configuration, the blower is separated from the tank unit and can be independently used for blowing. In combined configuration, the blower air-inlet and the tank unit are detachably combined and sealed. In combined configuration, the negative pressure generated by airflow driven by the blower is transmitted to the tank air-inlet through the tank and the filter. The blower is a portable blower, which can be held with one hand by the user for prolonged blowing on the pet without need for an external flexible hose.

18 Claims, 11 Drawing Sheets

(51) Int. Cl.
  *A47L 5/36* (2006.01)
  *A47L 7/00* (2006.01)
  *A47L 7/04* (2006.01)

(52) U.S. Cl.
  CPC .............. *A47L 7/0066* (2013.01); *A47L 7/04* (2013.01); *A45D 2020/128* (2013.01)

(56) References Cited

U.S. PATENT DOCUMENTS

| | | | | |
|---|---|---|---|---|
| 4,729,147 | A * | 3/1988 | Armbruster | A47L 5/36 |
| | | | | 15/352 |
| 4,977,690 | A * | 12/1990 | Davis, Jr. | F26B 21/001 |
| | | | | 34/100 |
| 5,924,215 | A * | 7/1999 | Goodsell | A45D 20/10 |
| | | | | 34/98 |
| 5,926,972 | A * | 7/1999 | Di Peso | A01K 13/001 |
| | | | | 34/128 |
| D427,393 | S * | 6/2000 | Bunch | D32/8 |
| 7,980,200 | B2 * | 7/2011 | Troutman | A01K 13/002 |
| | | | | 119/6.5 |
| 8,371,246 | B1 * | 2/2013 | Streng | A01K 13/001 |
| | | | | 119/668 |
| 9,220,237 | B1 * | 12/2015 | Dryden | A01K 13/002 |
| 9,713,370 | B2 * | 7/2017 | Thomason | A45D 20/08 |
| D838,061 | S * | 1/2019 | Wu | D30/158 |
| 11,019,803 | B2 * | 6/2021 | Takla | A01K 13/001 |
| 11,123,678 | B2 * | 9/2021 | Stang | B01D 53/0407 |
| 11,156,229 | B2 * | 10/2021 | Johnson | F04D 29/584 |
| 11,785,919 | B2 * | 10/2023 | Meeks | A01K 13/001 |
| | | | | 119/606 |

* cited by examiner

PET GROOMING MACHINE AND A METHOD FOR PET HAIR GROOMING

RELATED APPLICATIONS

This application claims priority from Chinese Patent Application No. 202221985511X filed Jul. 29, 2022, No. 2022109331803 filed Aug. 4, 2022, and No. 2023108748397 filed Jul. 17, 2023, each of which is incorporated herein by reference in its entirety.

FIELD OF INVENTION

This invention relates to pet grooming appliances, specifically to a pet grooming machine and a method for pet hair grooming.

BACKGROUND OF INVENTION

More and more families are keeping pets, cats, dogs and alike shed a lot all the year, this requires frequent vacuuming of loose hair for house-keeping. In addition, cats and dogs need regular bathing to keep clean so quick hair-drying needed after each bathing, all of such work requires application of specialized appliances.

China patent CN208462686U discloses a dual-motor pet dryer comprises two series motors to get maximum airflow, this makes machine large and heavy so inconvenient for moving and storage.

In addition, traditional pet grooming machine uses AC series motor, which rotates generally less than 40,000 rpm. In order to obtain high airflow, the series motor is large in diameter, generally greater than ϕ105 mm, even ϕ130 mm also commonly used. Large impeller requires greater input power and difficult to keep parts accuracy and dynamic balance. Therefore, traditional pet grooming machine using AC series motors are very noisy.

In addition, the AC series motor used in the traditional pet grooming machine is large and more than 1 kg in weight, coupled with a relatively large case, this kind of grooming machine weighs up to 3 kilograms, it is difficult for user to hold it with single hand so it must be coupled with a blowing flexible hose in order to change direction freely for drying different parts of pet body.

So, it is necessary for a pet grooming machine which can output high airflow volume, can also vacuum loose hair and other dust, with low noise and easy to move and store, as well a proper method for pet hair grooming.

SUMMARY OF INVENTION

This invention is for solving the above problems and aims to provide a pet grooming machine and a method for pet hair grooming.

This invention provides a pet grooming machine, characterized in that it comprises: a blower that comprises at least a blower main body and a power cord, the blower main body comprises at least: a blower air-inlet, a motor unit, a blower air-outlet, and an air channel in communication with the blower air-outlet and the blower air-inlet; and a tank unit that comprises at least a tank, a tank air-inlet, a filter, and an air-outlet, the tank air-inlet is provided on the tank, and the filter is mounted inside tank for receiving and intercepting hair and other dust. The blower and tank unit can be in two configurations, namely, separated configuration and combined configuration, when in separated configuration, the blower is separated from the tank unit, and the blower can be used for blowing independently, when in combined configuration, the blower air-inlet and tank unit are detachably connected in a sealed manner and, after starting blower main body in combined configuration, negative pressure generated by airflow driven by the blower main body can be sufficiently transmitted to tank air-inlet through tank and filter, wherein the blower is a portable blower so user can hold it with single hand for long time blowing on pet without flexible hose, user can just turn wrist to transmit airflow to different parts of pet body.

Pet grooming machine provided by this invention can be furtherly characterized in that: the motor unit comprises at least a motor and a printed circuit board (PCB) separated from the motor; the tank unit furtherly comprises an outlet-air guiding case, and the outlet-air guiding case is located downstream of the filter; in combined configuration, the blower air-inlet extends into outlet-air guiding case; the blower main body is detachably connected to tank unit in a sealed manner, after starting the blower main body in combined configuration, negative pressure generated by airflow driven by the blower main body can be sufficiently transmitted to tank air-inlet through outlet-air guiding case, the filter and the tank; the air-outlet is located downstream of air channel inside tank unit, the airflow enters air channel inside tank from tank air-inlet, passes through filter, flows through outlet-air guiding case, and then exits from tank unit through air-outlet, and when in combined configuration, at least a part of motor unit is located inside outlet-air guiding case.

The pet grooming machine provided by this invention can be further characterized in that: in combined configuration a part of the motor is located inside the outlet-air guiding case.

The pet grooming machine provided by this invention can be further characterized in that: PCB locates in air channel of the portable blower, upstream of the motor, and a part of PCB locates inside outlet-air guiding case in combined configuration.

The pet grooming machine provided by this invention can be further characterized in that: both motor and PCB are located inside outlet-air guiding case when in combined configuration.

The pet grooming machine provided by this invention can be further characterized in that: the filter is in the form of a cylinder, inner surface of the filter encloses a cavity, and the cavity forms at least a part of outlet-air guiding case, at least a part of motor unit is located inside the cavity enclosed by filter when in combined configuration.

The pet grooming machine provided by this invention can be further characterized in that: the blower main body further comprises a heating coil, the heating coil is provided downstream of motor unit, and temperature of airflow from blower air-outlet does not exceed 80° C.

The pet grooming machine provided by this invention can be further characterized in that: the motor unit is a high-speed brushless motor unit, and the motor is a high-speed brushless motor.

The pet grooming machine provided by this invention can be further characterized in that: the motor unit comprises two motors, one is a blowing motor and the other is a suction motor, and airflow generated by one motor does not flow through the other motor.

The pet grooming machine provided by this invention can be further characterized in that: the blowing motor and the suction motor are controlled by the same power switch, in combined configuration, the power switch can only start or shut-off the suction motor, and in separated configuration, the power switch can only start or shut-off the blowing motor.

This invention provides a method for pet hair grooming, characterized in that: use any of above pet grooming machines for pet hair grooming, when drying wet pet hair, leave portable blower in separated configuration with tank unit, and use portable blower alone to blow pet body; when vacuuming, leave portable blower in combined configuration with tank unit, start portable blower to generate negative pressure at tank air-inlet, and vacuum loose hair and dust from pet body through appropriate extension hose and suction nozzle.

The pet hair grooming method provided by this invention can be further characterized in that: upon completion of vacuuming loose hair and dust from pet body, leave portable blower in separated configuration with tank unit, start portable blower and heating coil, and blow hot air into tank air-inlet with portable blower to kill fleas, ticks and other parasites that may be carried in loose hair inside the tank.

The pet hair grooming method provided by this invention can be further characterized in that: when blowing hot air into tank air-inlet with portable blower, reduce ventilation area of the tank unit air-outlet to slow down airflow from said tank unit and induce temperature inside tank unit to reach about 60° C. in order to kill fleas, ticks and other parasites that may be carried in loose hair inside the tank.

Effect of Invention

The pet grooming machine claimed by this invention comprises portable blower and tank unit, the main body of portable blower comprises at least: a blower air-inlet, a motor unit, a blower air-outlet, and an air channel in communication with blower air-outlet and blower air-inlet; a tank unit that comprises at least a tank, a tank air-inlet, a filter, an outlet-air guiding case, and an air-outlet, the portable blower and tank unit can be in two configurations, namely, separated configuration and combined configuration. In separated configuration, the portable blower is separated from the tank unit and can be held with single hand by user for long time blowing on pet without flexible hose, user can transmit airflow to different positions of pet body by simply turning wrist for drying pet hair; in combined configuration the blower main body and tank unit are detachably connected in a sealed manner, after blower started in combined configuration, the negative pressure generated by airflow driven by blower main body can be sufficiently transmitted to tank air-inlet through tank and filter, the tank air-inlet can in turn be combined with vacuuming accessories such as extension hose and suction nozzle to vacuum loose hair and dust from pet body. Therefore, the pet grooming machine is easy to switch between blowing and vacuuming for pet grooming, and easy to move and store.

The pet hair grooming method claimed by this invention can switch between blowing and vacuuming with ease. The portable blower can be separated from tank unit so user can hold blower by single hand for long time blowing without flexible hose and, when portable blower is started in combined configuration with tank unit, the machine can vacuum loose hair and dust.

DETAILED DESCRIPTION OF PREFERRED EMBODIMENTS

In order to make it easy to understand the technical means, innovation details, objectives and effects achieved by this invention, the following embodiments and drawings are used to elaborate the pet grooming machine and the method for pet hair grooming of present invention.

Embodiment 1

Figure 1:
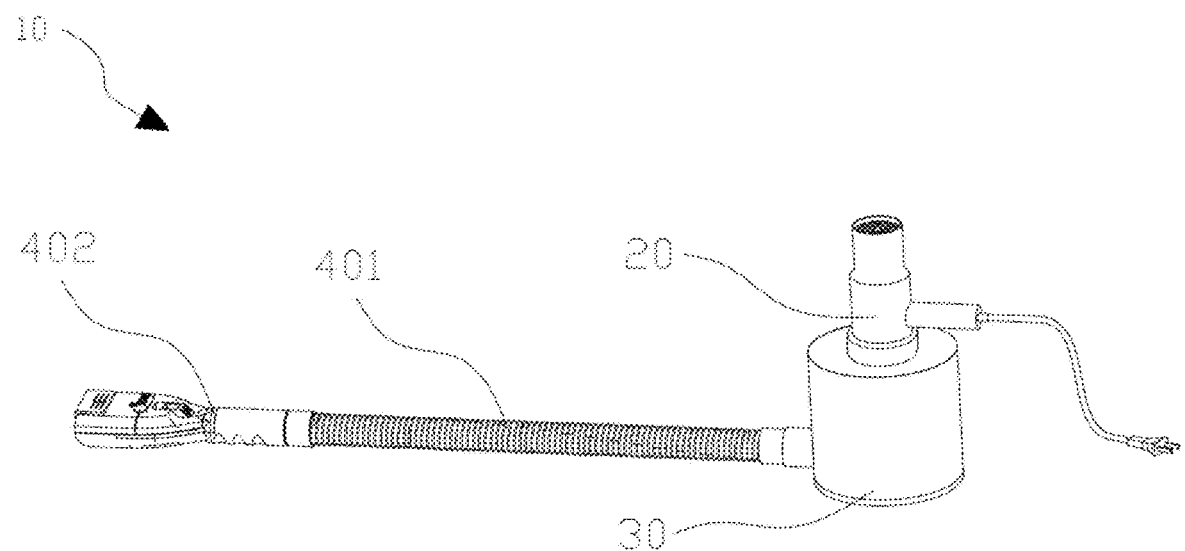
FIG. 1 is a schematic view in combined configuration for pet grooming machine in embodiment 1.
Figure 2:
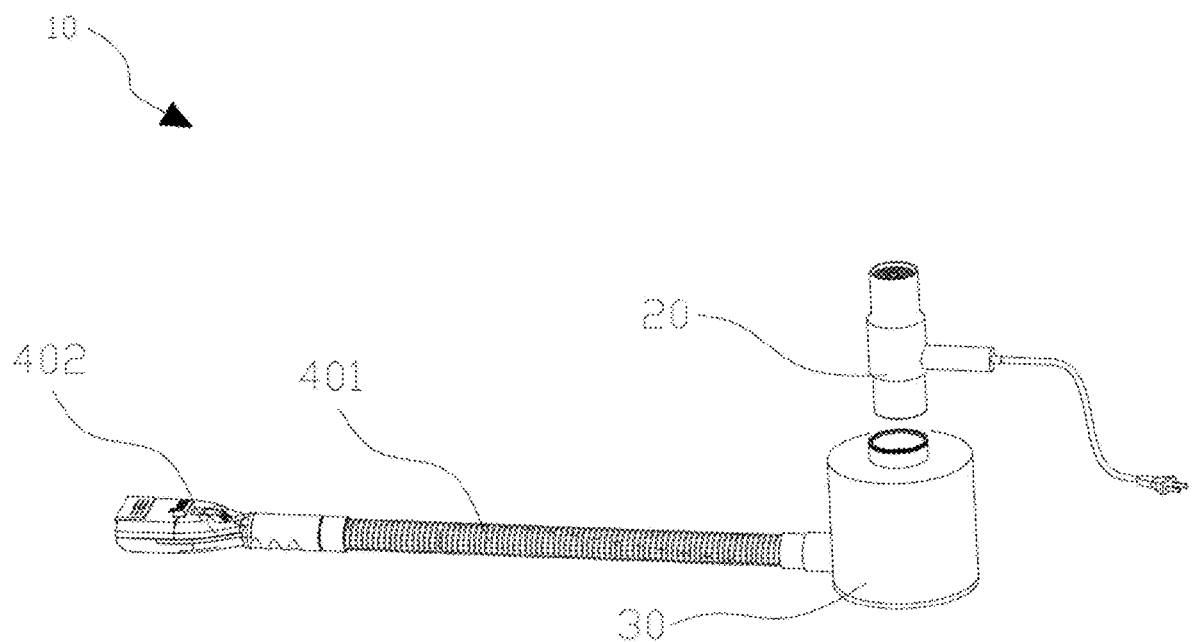
FIG. 2 is a schematic view in separated configuration of embodiment 1.

FIG. 1 is a schematic view of pet grooming machine in combined configuration in embodiment 1 and FIG. 2 is a schematic view in separated configuration of embodiment 1.

As shown in FIGS. 1 and 2, the pet grooming machine 10 comprises at least a portable blower 20 and a tank unit 30 and can further comprises flexible hose 401 and suction nozzle 402 for vacuuming, blowing nozzles (not shown in schematic view), and other commonly used hair grooming accessories.

The portable blower 20 and tank unit 30 can be in two configurations, one is combined configuration, and the other is separated configuration. As shown in FIG. 1, in combined configuration, portable blower 20 is detachably connected to tank unit 30 in a sealed manner. When powered on, the portable blower 20 acts as a source of negative pressure for tank unit 30 and can vacuum hair and other dust through flexible hose 401 and suction nozzle 402 leading from the tank unit 30.

As shown in FIG. 2, in separated configuration, portable blower 20 and tank unit 30 are independent and separated from each other, user can use portable blower separately to dry pet hair.

The portable blower 20 comprises at least blower main body 201 and power cord 202. AC motor inside portable blower 20 is continuously fed with electrical energy through power cord 202, so the blower can blow for long time, such as more than one hour, or even two hours or longer. High speed brushless AC motor is used in such portable blowers, the motor speed is generally greater than 80,000 rpm, some can reach 120,000 rpm or even higher. The high-speed brushless motor is significantly smaller in motor diameter, generally φ35 mm or so, thus relatively low power is sufficient to ensure smooth and high-speed rotation of the impeller. While ensuring output airflow, it is also easier to maintain dynamic balance of the parts. Therefore, the pet grooming machine using high speed brushless motor has significantly reduced working noise and sufficiently high airflow.

The high-speed brushless motor used in portable blower 20 is compact and light in weight, generally about 300 grams. Pet grooming machine 10 using such motor can also be small and lightweight, and blower main body 201 is generally less than 1 kilogram, similar to blower for drying human hair, user can easily hold blower with single hand for long time blowing, can transmit airflow to different positions by simply turning hand wrist so no need help of flexible hose.

Figure 3:
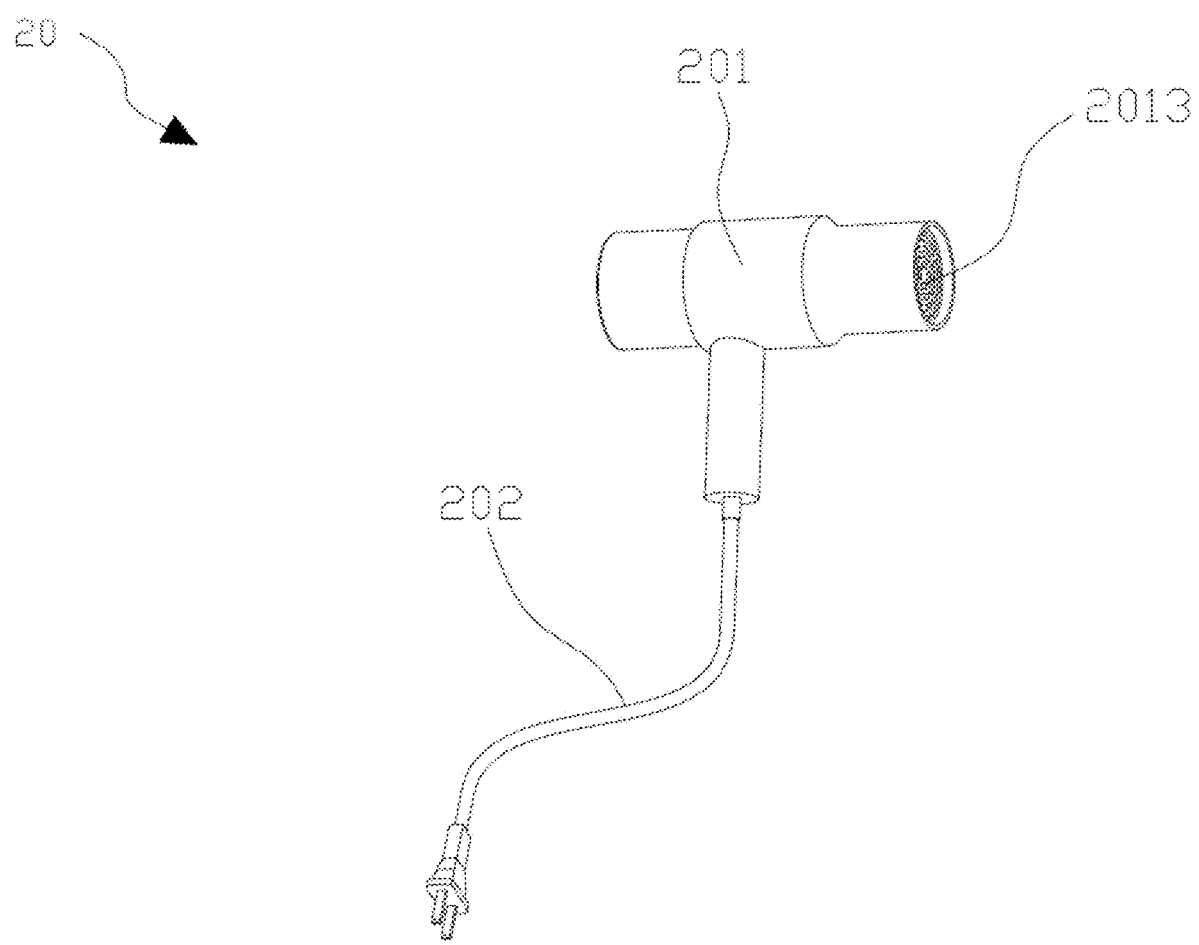
FIG. 3 is a schematic view of portable blower in embodiment 1.
Figure 4:
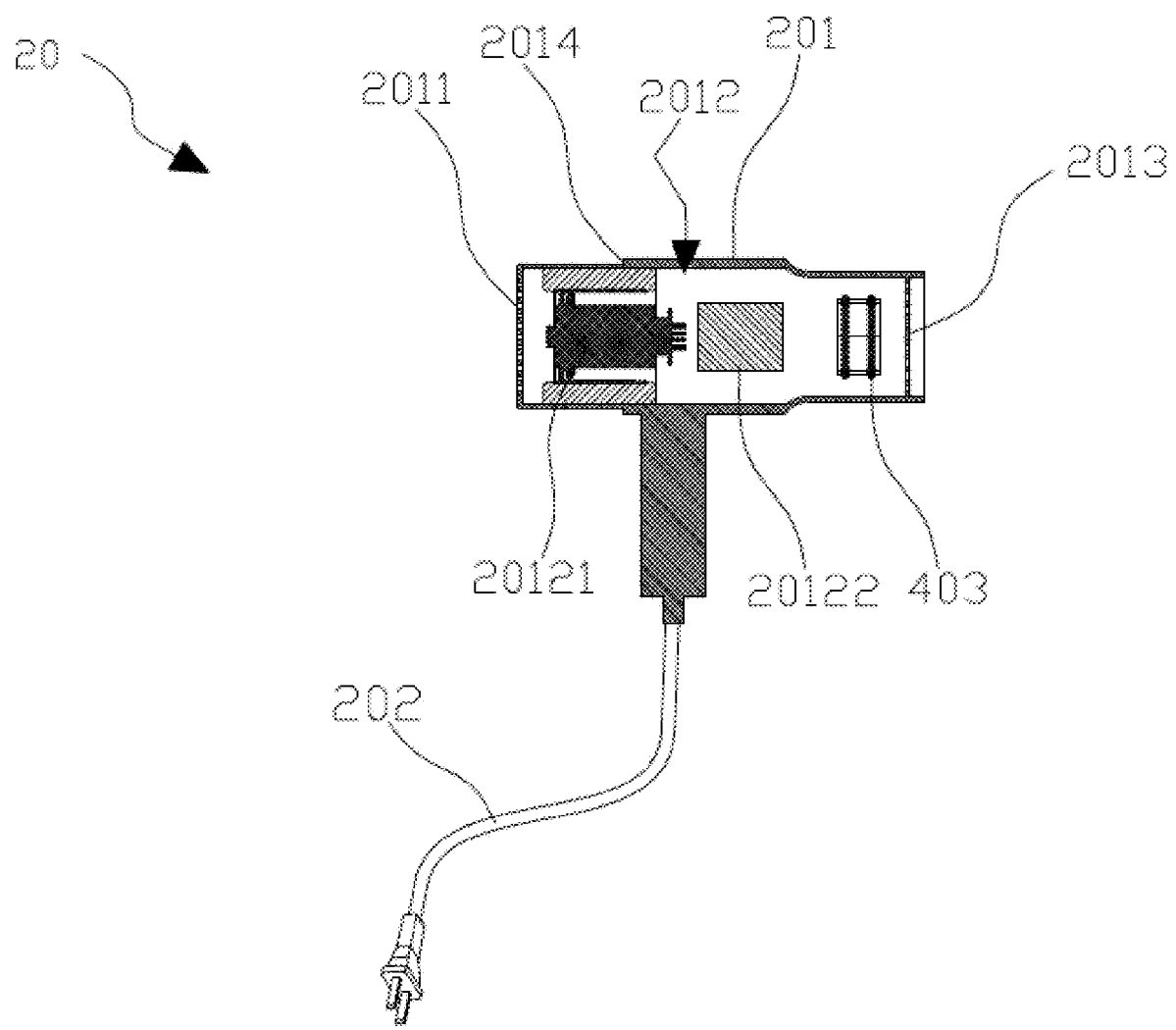
FIG. 4 is a sectional view of portable blower in embodiment 1.

FIG. 3 is a schematic view of structure of portable blower in embodiment 1, and FIG. 4 is a sectional view of the portable blower.

As shown in FIGS. 3 and 4, the blower main body 201 comprises at least: blower air-inlet 2011, high speed brushless motor unit 2012, heating coil 403, blower air-outlet 2013, and air channel in communication with blower air-outlet 2013 and blower air-inlet 2011. The high-speed brushless motor unit 2012 comprises at least high-speed brushless motor 20121 and printed circuit board (PCB) 20122. Rotating parts of high-speed brushless motor 20121 are located in a housing, PCB 20122 is separated from the housing of high-speed brushless motor 20121 and connected with high-speed brushless motor 20121 through circuit.

As shown in FIG. 4, blower main body 201 is T-shaped with vertical part work as handle, a power cord is connected to the blower main body 201 from bottom of the handle; the horizontal part comprises blower air-inlet 2011, high speed brushless motor 20121, PCB 20122, heating coil 403, and blower air-outlet 2013, which are arranged in sequence. High speed brushless motor 20121 is adjacent to blower air-inlet 2011. This compact design makes the blower main body 201 compact so it is easy for user to hold with a single hand and change the blowing direction at will, and easy to dry different parts of the pet body for a long time without feeling tiresome.

Figure 5:
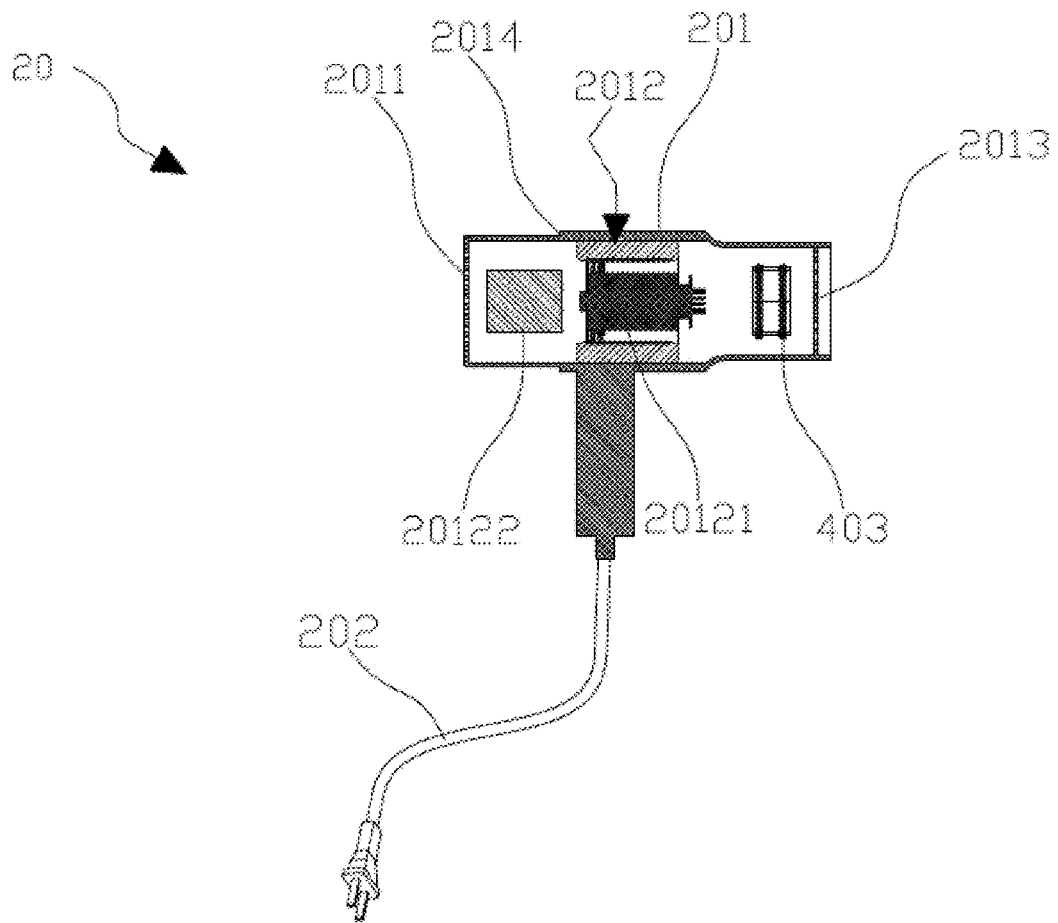
FIG. 5 is a sectional view of portable blower in embodiment 1, with a printed circuit board (PCB) in new position.

FIG. 5 is a sectional view of portable blower in embodiment 1 with PCB in new position.

As shown in FIG. 5, PCB 20122 of the blower main body 201 can be placed upstream of the high-speed brushless motor 20121 to be closer to the blower air-inlet 2011.

In addition, PCB 20122 can also be placed in a vertical handle (not shown in the figure), and an air channel provided in vertical handle to induce airflow for cooling PCB. The high-speed brushless motor 20121 is still placed in horizontal part of T-shaped structure, and the high-speed brushless motor 20121 still adjacent to the blower air-inlet 2011 in an effort to make blower main body compact and lightweight.

In embodiment 1, the blower main body is a T-shaped structure comprising a horizontal unit and a vertical unit, the vertical unit acts as a handle, the blower air-inlet 2011 and the blower air-outlet 2013 are respectively located at opposite ends of the horizontal unit. In addition, the blower air-inlet can also be made as many small holes distributed on a horizontal unit and adjacent to the high-speed brushless motor unit 2012.

Figure 6:
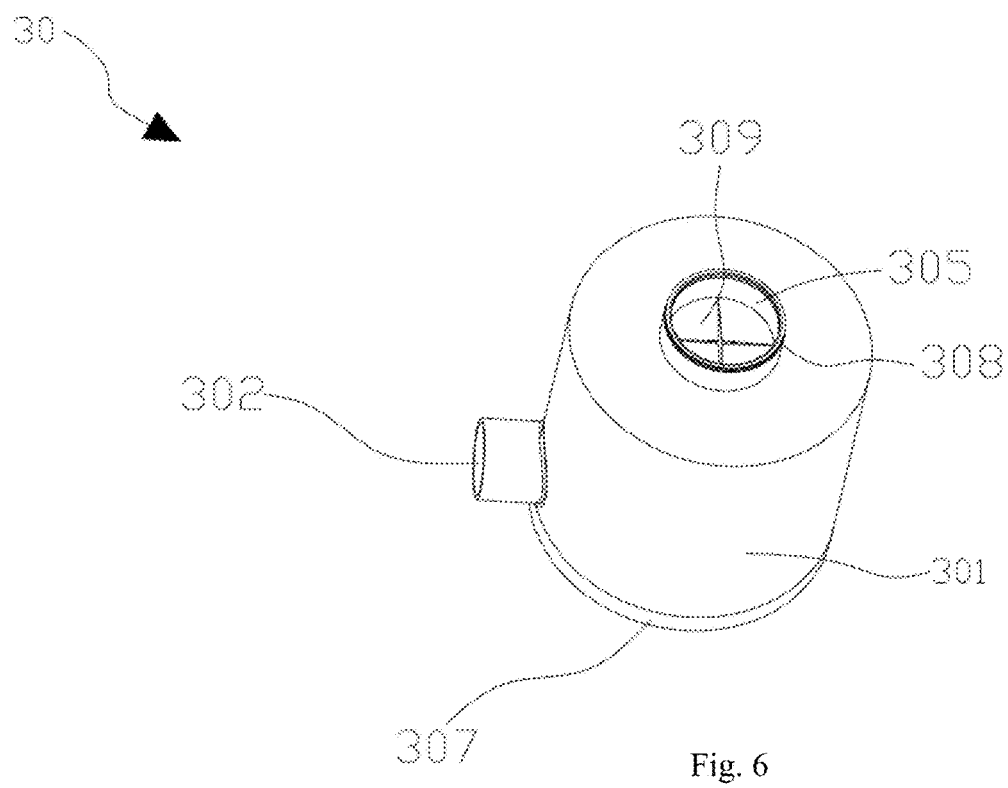
FIG. 6 is a schematic view of tank unit in embodiment 1.
Figure 7:
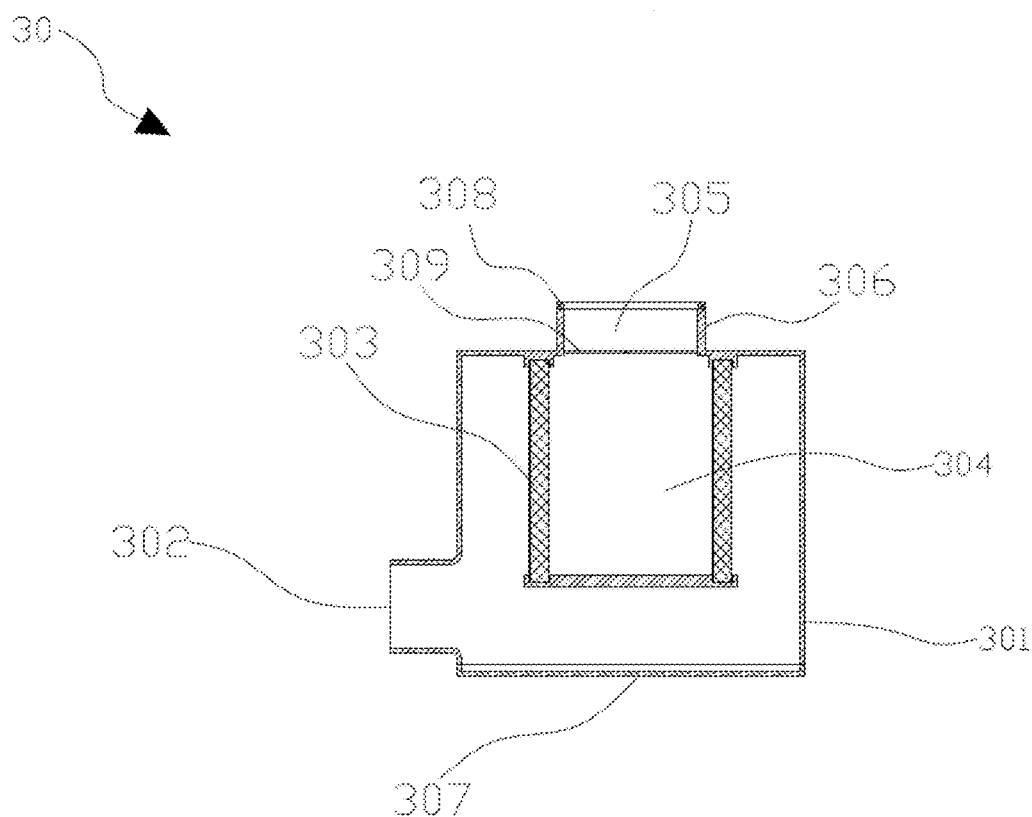
FIG. 7 is a sectional view of tank unit in embodiment 1.

FIG. 6 is a schematic view of tank unit in embodiment 1 and FIG. 7 is a sectional view of tank unit.

As shown in FIGS. 1, 6 and 7, tank unit 3 comprises at least a tank 301, a tank air-inlet 302, a filter 303, an outlet-air guiding case 304 and an air-outlet 305. The tank air-inlet 302 is provided on tank 301. Filter 303 is mounted inside tank 301. When the portable blower 20 and the tank unit 30 are in combined configuration as shown in FIG. 1, the air-inlet 2011 of portable blower 20 passes through the air-outlet 305 of the tank unit 30 and enters the outlet-air guiding case 304, the tank unit 30 supports the blower main body 201, the blower main body 201 is connected to the outlet-air guiding case 304 in a sealed manner to ensure all negative pressure generated by the blower main body 201 are transmitted to the tank air-inlet 302, a suction airstream flows from the tank air-inlet 302 into the tank 301, passes through the filter 303 to enter the outlet-air guiding case 304, then passes through blower air-inlet 2011 to enter blower main body 201, traverses air outlet 305 through an air channel inside the blower main body 201, and in turn flows out from the blower air-outlet 2013 to open air.

In embodiment 1, filter 303 comprises a cylindrical pleated paper, its outer surface can trap hair and other dust while letting clean air go through. It surrounds a hallow cavity, constituting at least a part of the outlet-air guiding case 304.

As shown in FIG. 7, filter 303 is cylindrical, its outer surface meets dust laden airflow. The inner surface of filter 303 is a cylindrical cavity, forming part of the outlet-air guiding case 304. The top opening of the cavity meets the air-outlet 305 of tank unit 30, surrounded by a side wall 306. The air-outlet 305 can be connected to the blower main body 201 in a sealed manner, such as the top of the air-outlet side wall 306 has a seal ring 308, and the blower main body 201 is provided with a circular skirt-sleeve 2014. The circular skirt-sleeve 2014 is made of a hard material with a pit toward the blower air-inlet 2011. When the portable blower 20 and tank unit 30 are in combined configuration, the seal ring 308 is tightly combined with the pit on the circular skirt-sleeve 2014 to get sealed fitting, and self-weight of the blower main body 201 promotes sealing reliability. Tank unit 30 can further be provided with additional clips for fixing the blower main body 201 when in combined configuration.

As shown in FIG. 4, the portable blower 20 has a built-in heating coil 403, which is a common structure. Blower main body 201 can be provided with a switch for controlling on/off of the heating coil 403 and can also be provided with a temperature adjusting device, so the portable blower 20 can blow airflow of different temperature, according to different room temperature. In this embodiment, the temperature limit of the blower air-outlet 2013 does not exceed 80° C.

As shown in FIGS. 1 and 6, when user connects the flexible hose 401 and the suction nozzle 402 to the tank air-inlet 302 in sequence, the portable blower 20 and tank unit 30 are in combined configuration. User now starts the blower main body 201 to get a negative pressure at the tank air-inlet 302 and groom the pet body with the suction nozzle 402 to comb and vacuum loose hair. Some pets may have fleas, ticks, or other parasites, which can be vacuumed into tank 301 along with loose hair. If left unattended, these parasites may multiply inside the tank, or escape if the user simply empties the tank and dumps the loose hair into trash. In order to kill parasites inside tank on time, the user can remove the portable blower 20 from tank unit 30, remove the flexible hose 401 from the tank air-inlet 302, start the motor and heating coil of portable blower 20, adjust the air-outlet temperature to the highest or proper, and align the blower air-outlet 2013 with the tank air-inlet 302 to blow the hot air into tank 301 to make inside of tank 301 reach about 65° C. According to medical research, it is known that parasites protein denature at around 40° C., and denature significantly at 60° C. Keeping temperature inside the tank unit 30 at 60° C. for about 10 minutes will kill common parasites.

In addition, as shown in FIGS. 6 and 7, the air-outlet 305 on tank unit 30 is provided with a circularly shaped soft blade 309, with two mutually perpendicular cut-outs dividing the soft blade 309 into four essentially equal and interconnected pieces, such that each of the small pieces can oscillate upwardly or downwardly, that is, oscillate to the direction parallel to the air-outlet side wall 306. As shown in FIG. 1, when in combined configuration, the blower main body 201 is mounted inside the outlet-air guiding case 304, and the soft blade 309 is pushed by the blower main body 201 toward inside of tank 301 and dispersed. The small pieces of the soft blade are respectively placed toward the bottom of the outlet-air guiding case 304, which will not impede the in and out movement of the blower main body 201 inside the outlet-air guiding case 304 and will not obstruct the airflow from passing through the air-outlet 305. Since, when in a combined configuration, the airflow is flowing through the air-outlet 305 from an air channel inside the blower main body 201. The airflow is in direct contact with the blower main body 201 when escaping from tank unit 30 while the blower main body 201 is in contact with peripheral of the air-outlet 305.

As shown in FIG. 2, in a separated configuration, the blower main body 201 is removed from the outlet-air guiding case 304. As shown in FIGS. 6 and 7, when the blower air-outlet 2013 blows the hot air into the tank 301 through the tank air-inlet 302, the airflow passes through the filter 303 and outlet-air guiding case 304. The airflow then flows further to air-outlet 305, which in turn pushes the small pieces of the soft blade 309 to oscillate toward the top of the air-outlet side wall. The pieces of the soft blade 309 are now in direct contact with the airflow inside of the air-outlet 305 to increase the resistance to the airflow inside the air-outlet 305, thereby slowing down the airflow from the tank to assist in increasing the air temperature inside the tank unit 30 and assist in killing the parasites trapped in loose hair inside the tank.

In addition, as shown in FIGS. 6 and 7, the bottom of tank 301 is provided with a bottom cover 307, which can be sealingly combined with tank 301, or opened with respect to tank 301 to remove the hair and other dust inside the tank. This is a common structure of vacuum cleaners and will not be discussed in detail herein.

In addition, for the blower main body 201 with T-shaped structure, the handle is foldable and tank 301 can be large enough to house the blower main body inside tank 301 to reduce packing volume and save freight in transportation.

The present embodiment also provides a method for pet hair grooming using the pet grooming machine 10, which comprises the following steps described herein.

Leave the portable blower in separated configuration with tank unit and use the portable blower alone to dry pet when necessary.

Leave the portable blower in the combined configuration with tank unit, start the portable blower to generate negative pressure at the tank air-inlet so as to vacuum the loose hair and dust from the pet body when necessary, through the appropriate hose and suction nozzle.

Upon completion of vacuuming, leave the portable blower in the separated configuration with tank unit, start the portable blower and heating coil, and blow the hot air into the tank air-inlet with the portable blower to induce the temperature inside the tank unit to reach about 60° C. in order to kill fleas, ticks and other parasites that may be carried in the loose hair vacuumed into the tank.

Effect of Embodiment 1

The pet grooming machine of embodiment 1 comprises a portable blower and a tank unit. The blower main body of the portable blower comprises at least: a blower air-inlet, a motor unit, a blower air-outlet, and an air channel in communication with blower air-outlet and blower air-inlet. The tank unit comprises at least a tank, a tank air-inlet, a filter, an outlet-air guiding case, and an air-outlet. The portable blower and tank unit can be in two configurations, namely, in a separated configuration and in a combined configuration. In separated configuration, the portable blower is separated from the tank unit, the user can hold the portable blower with her single hand for long time blowing on the pet body without need of the flexible hose and can transmit the airflow to different positions of the pet body by simply turning her wrist. In the combined configuration, the blower main body and tank unit are detachably connected in a sealed manner. After starting blower main body in the combined configuration, the negative pressure generated by the airflow driven by the blower main body can be sufficiently transmitted to the tank air-inlet through the tank and filter, the user can then vacuum the looser hair and other dust from the pet body with proper vacuum accessories, such as the extension hose and suction nozzle.

In addition, in embodiment 1, the motor unit comprises at least a motor, and the tank unit further comprises an outlet-air guiding case which is located downstream of filter. In the combined configuration, the blower air-inlet extends into the outlet-air guiding case and is at least partially located inside the outlet-air guiding case. The airflow enters an air channel inside the tank from the tank air-inlet, passes through the filter, flows through the outlet-air guiding case, and then escapes from the tank unit through the air-outlet. The combined configuration enables a compact size for the grooming machine, and also shortens the air channel to reduce the energy loss in the air channel.

In addition, as the portable blower uses the high-speed brushless motor unit, the portable blower can generate the same airflow volume while its size is greatly reduced compared to the universal pet dryer with series motor. The portable blower in this invention is also easy to carry and less noisy. The portable blower of this invention can be independently operated with a single hand for pet drying, there is no need for additional flexible hoses for hair blowing, which makes it more convenient to use.

Further, as the filter is in the form of a cylinder, its inner surface encloses a cavity. The cavity forms at least a part of the outlet-air guiding case, such arrangement can further shorten the vacuum air channel, reduce the energy loss in the air channel, and improve the hair vacuuming efficiency.

Further, as the air-outlet is provided with a seal ring, the blower main body is provided with a circular skirt-sleeve with pit, in combined configuration. The seal ring is tightly combined with the pit on circular skirt-sleeve to achieve tight sealing, thereby ensuring sealing performance between the portable blower main body and tank unit and is easy to separate the portable blower from the tank unit when necessary.

In addition, the method for pet hair grooming disclosed by embodiment 1 is easy to switch between blowing and vacuuming because of this special pet grooming machine. The portable blower is separated from the tank unit in blowing, user can hold the blower, with a single hand, for long time while blowing on the pet body without need for flexible hose. The portable blower is in the combined configuration with the tank unit in vacuuming. The user can vacuum the loose hair and dust after starting the portable blower, so the grooming method is simple and easy to carry out.

Embodiment 2

For ease of expression for embodiment 2, structures same as those in embodiment 1 are given relevant symbols without repeating the description.

Figure 8:
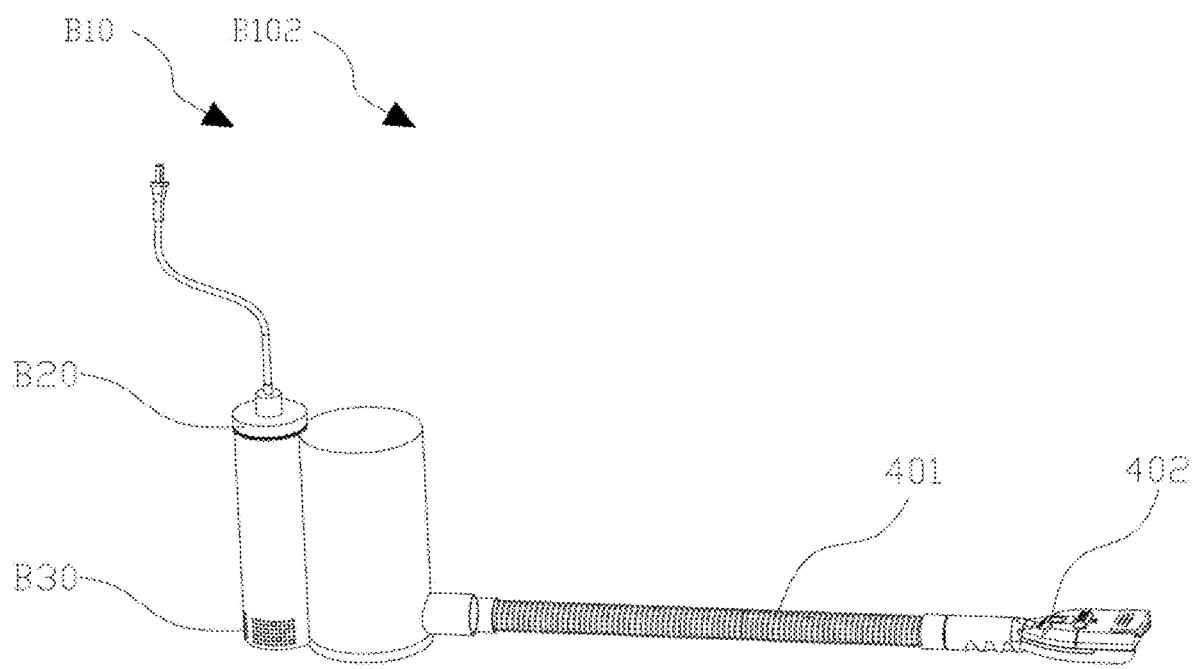
FIG. 8 is a schematic view of pet grooming machine in combined configuration in embodiment 2.
Figure 9:
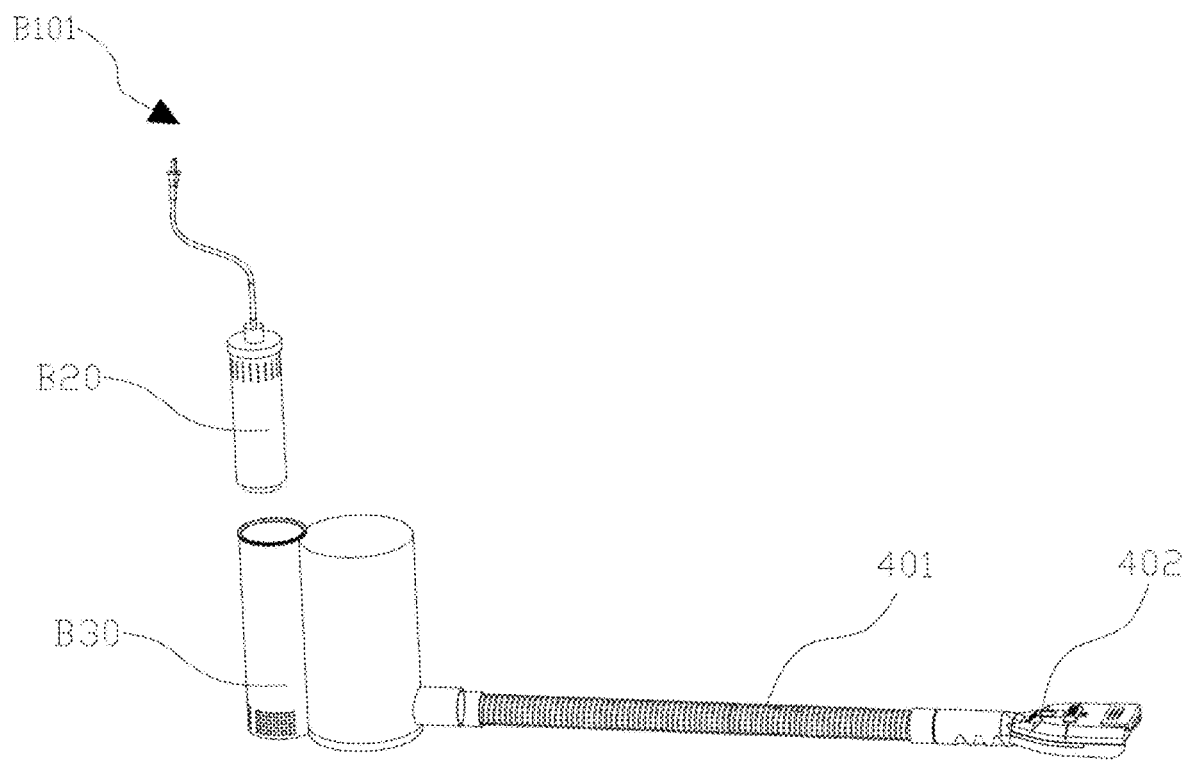
FIG. 9 is a schematic view of separated configuration in embodiment 2.
Figure 10:
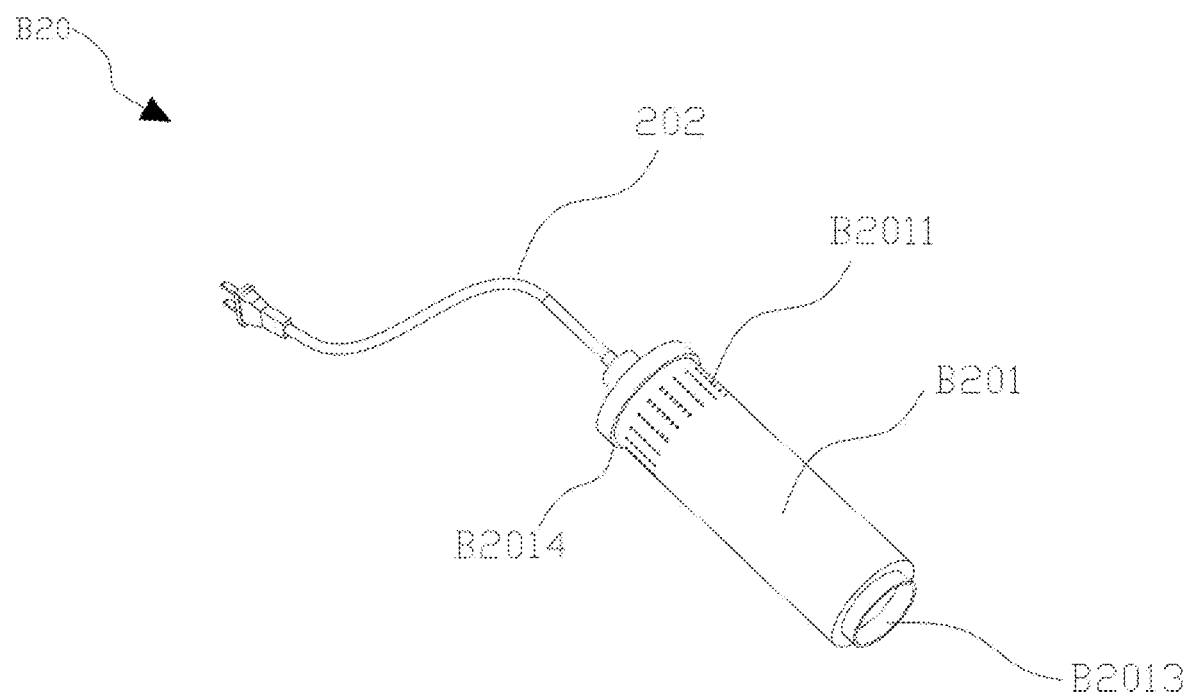
FIG. 10 is a schematic view of portable blower in embodiment 2.
Figure 11:
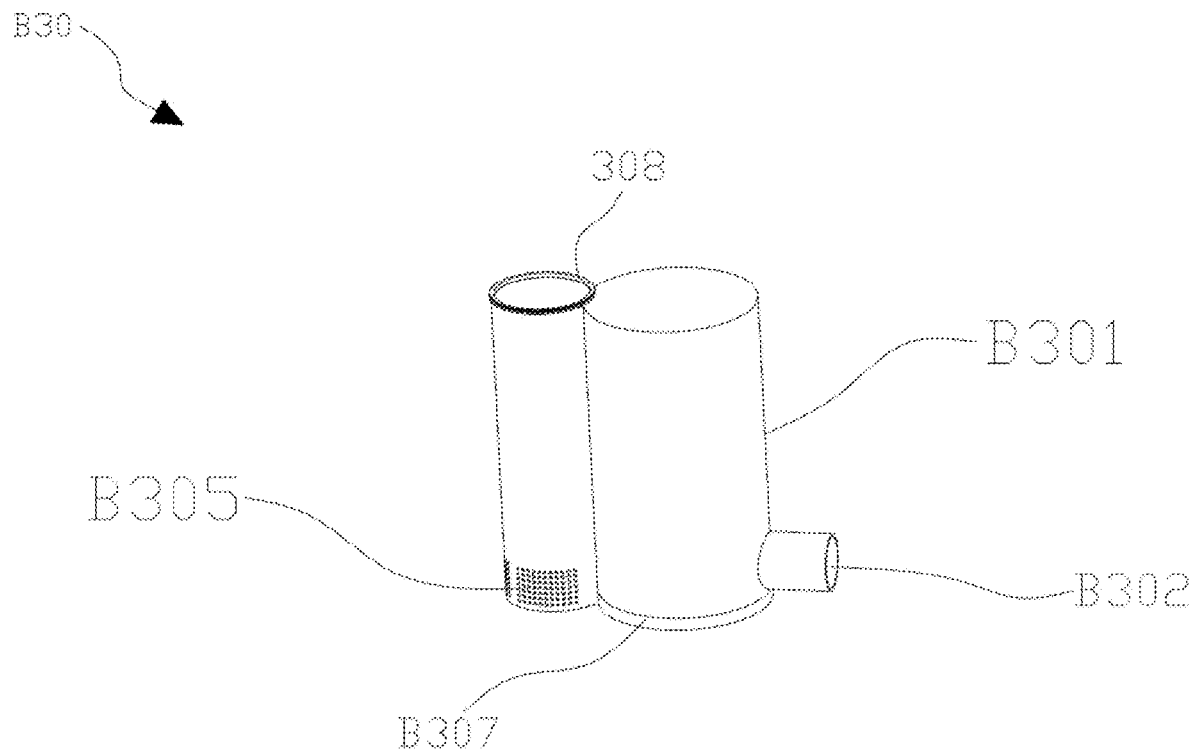
FIG. 11 is a schematic view of tank unit in embodiment 2.
Figure 12:
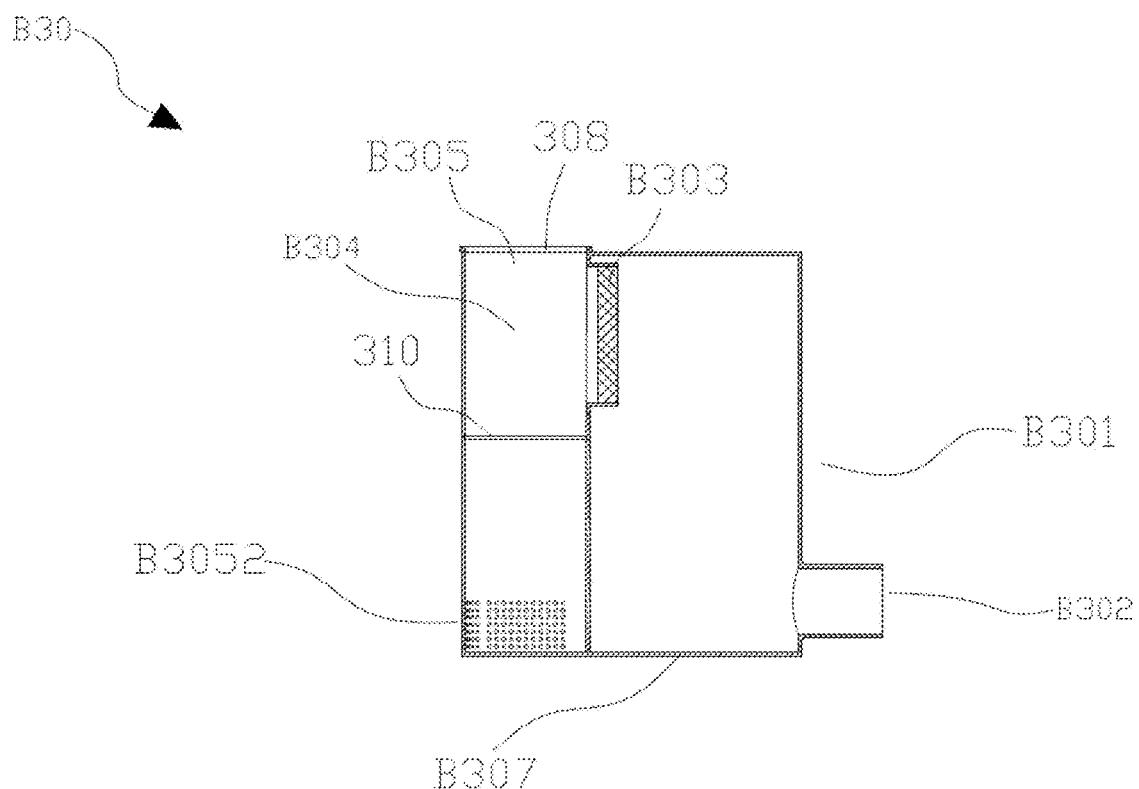
FIG. 12 is a sectional view of tank unit in embodiment 2.

FIG. 8 is a schematic view in the combined configuration of embodiment 2, FIG. 9 is a schematic view of the separated configuration of embodiment 2, FIG. 10 is a schematic view of the portable blower, FIG. 11 is a schematic view of the tank unit, and FIG. 12 is a sectional view of the tank unit.

As shown in FIGS. 8 to 12, the outlet-air guiding case B304 inside the tank unit B30 in embodiment 2 is big in size, and the portable blower B20 is linear in shape. In the combined configuration, the blower main body B201 passes through the air-outlet B305 to enter the outlet-air guiding case B304 and combines with the outlet-air guiding case B304 in a sealed manner. The blower air-outlet B2013 is located at the bottom of the outlet-air guiding case B304, and the blower air-inlet B2011 is located at the top of the outlet-air guiding case. When started with the blower main body B201 in this configuration, the airstream flows from the vacuuming accessories into the flexible hose, enters tank B301, then passes through the filter B303 to enter the outlet-air guiding case B304. The airstream further passes through the blower air-inlet B2011 to enter the inside of blower main body B201, then passes through the air channel inside the blower main body B201 to reach the blower air-outlet B2013 and finally escapes from tank unit B30 through the bottom air-outlet B3052 of the outlet-air guiding case B304. That is to say, when the airstream flows out of the tank unit B30, it is the tank unit that comes into direct contact with the escaping airstream. In order to ensure that the airstream flows along above the air channel, a seal ring B310 needs to be set between blower main body B201 and the outlet-air guiding case B304. The seal ring B308 between the air-outlet B305 and the blower main body B201 is similar to the sealing in embodiment 1, which are common structures in vacuum cleaner industry, and thus will not be described in detail herein.

The portable blower, in embodiment 2, is linear in shape, not T-shaped, its internal parts are basically same as those in embodiment 1. In the combined configuration, the blower main body B201 falls completely inside the outlet-air guiding case B304, so the high-speed brushless motor unit is also completely inside the outlet-air guiding case B304, which ensures that the pet grooming machine in combined configuration has a better integrity in shape and looks more like a complete product.

The filter B303 in embodiment 2 is flat, this makes the internal space of the tank B301 larger. In packaging and transportation, the blowing nozzles or suction nozzles as well as the blower main body B201 can be placed inside the tank, so to reduce packaging volume and lowering the transportation cost.

Embodiment 3

The pet grooming machines claimed in embodiments 1 and 2 uniformly comprise a portable blower and a tank unit, both having a separated configuration and a combined configuration. Both embodiments 1 and 2 comprise a portable blower comprising at least a blower body and a power cord, both embodiments 1 and 2 comprise a high-speed brushless motor unit comprising a high-speed brushless motor and a PCB. The structure of the high-speed brushless motor unit in embodiment 3 is different from that of embodiments 1 and 2, while other parts are generally same as those in embodiments 1 and 2.

For ease of expression, structures same as those in embodiments 1 and 2 are given relevant symbols without their descriptions being repeated herein.

Figure 13:
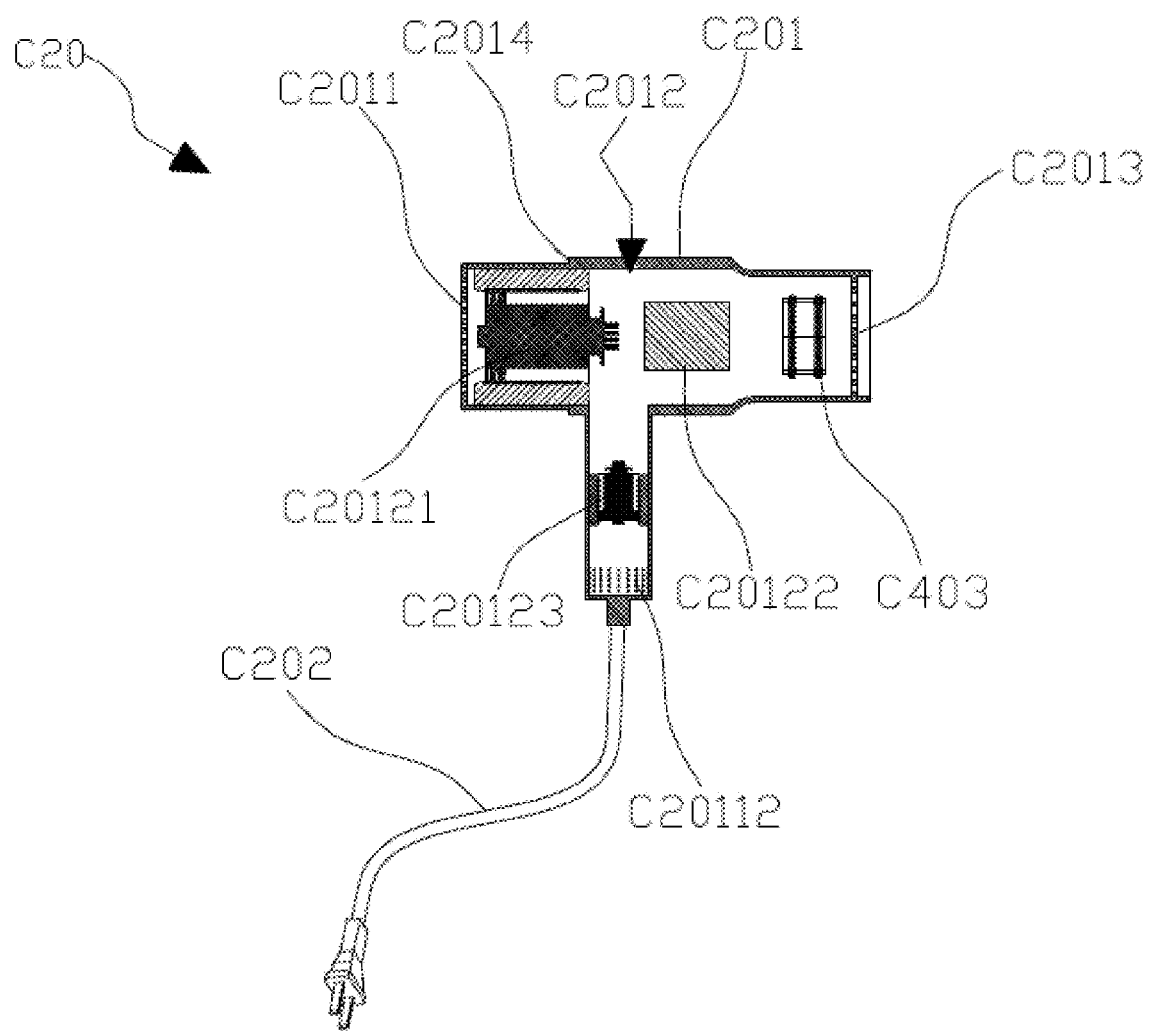
FIG. 13 is a schematic view of embodiment 3.

FIG. 13 is a schematic view of the pet grooming machine in embodiment 3.

As shown in FIG. 13, while keeping basic structure same as in embodiments 1 and 2, the high-speed brushless motor unit of the pet grooming machine C20 in embodiment 3 comprises two motors, preferably one is a high-speed brushless suction motor C20121, and the other is a high-speed brushless blowing motor C20123, each has a control circuit, and the two sets of circuits can be provided on one printed circuit board (PCB) C20122, or divided into two PCs, each controlling a respective high-speed brushless motor. The high-speed brushless suction motor C20121 is preferably a wet-and-dry motor.

The blower main body C201 is T-shaped and comprises a horizontal unit and a vertical unit. The vertical unit acts as a handle, and a power cord C202 supplies power to the pet grooming machine C20 through the vertical unit. The air-inlet C20112 of the high-speed brushless blowing motor C20123 is in the end of the handle and close to the blowing motor C20123. The high-speed brushless suction motor C20121 is placed in the horizontal unit, and the air-inlet C2011 is in the end of horizontal unit and adjacent to the suction motor C20121. The two motors share one air-outlet C2013, which is the air-outlet C2013 of the blower main body. Under the structure of embodiment 3, none of the airstream generated by one motor passes through the other motor, so the airstream is subjected to a minimal resistance on the air channel.

The blower main body C201 comprises two high-speed brushless motors, but they are controlled by only one power switch. In order to avoid unexpected results by starting the wrong motor, in the combined configuration, the power switch can only start the high-speed brushless suction motor C20121 for vacuuming. In the separated configuration, the power switch can only start the high-speed brushless blowing motor C20123 for drying.

Specific practice is preferred as follows: the tank unit is provided with a magnet inside, and PCB C20122 is provided with Hall element, when the portable dryer and tank unit are in the combined configuration. Hall element in PCB C20122 is adjacent to magnet inside tank unit. In the combined configuration, if power cord C202 is connected to a power grid and the switch is on, Hall element generates an electric signal to cut off the circuit between switch and the high-speed brushless blowing motor C20123 and connects the circuit between the switch and high-speed brushless suction motor C20121. Thereby connecting the power cord and the high-speed brushless suction motor C20121 to generate suction in the tank unit.

When the pet grooming machine and tank unit are in the separated configuration, the Hall element in the blower main body C201 is far away from the magnet inside the tank unit. Now when the switch is turned on, the Hall element will not act, PCB C2012 can only connect circuit between the switch and the blowing motor C20123, and in the same time, cuts off the circuit between the switch and the high-speed brushless suction motor C20121.

There is also a heating coil C403 in embodiment 3, which is similar to embodiment 1, hence not described in detail herein.

The air-inlet of the high-speed brushless suction motor can be equipped with a high-efficiency filter for intercepting loose hair and other dust.

Embodiment 4

For easy expression, the structures in embodiment 4 that are same as those in embodiment 1 are given relevant symbols without repeating their descriptions herein.

Figure 14:
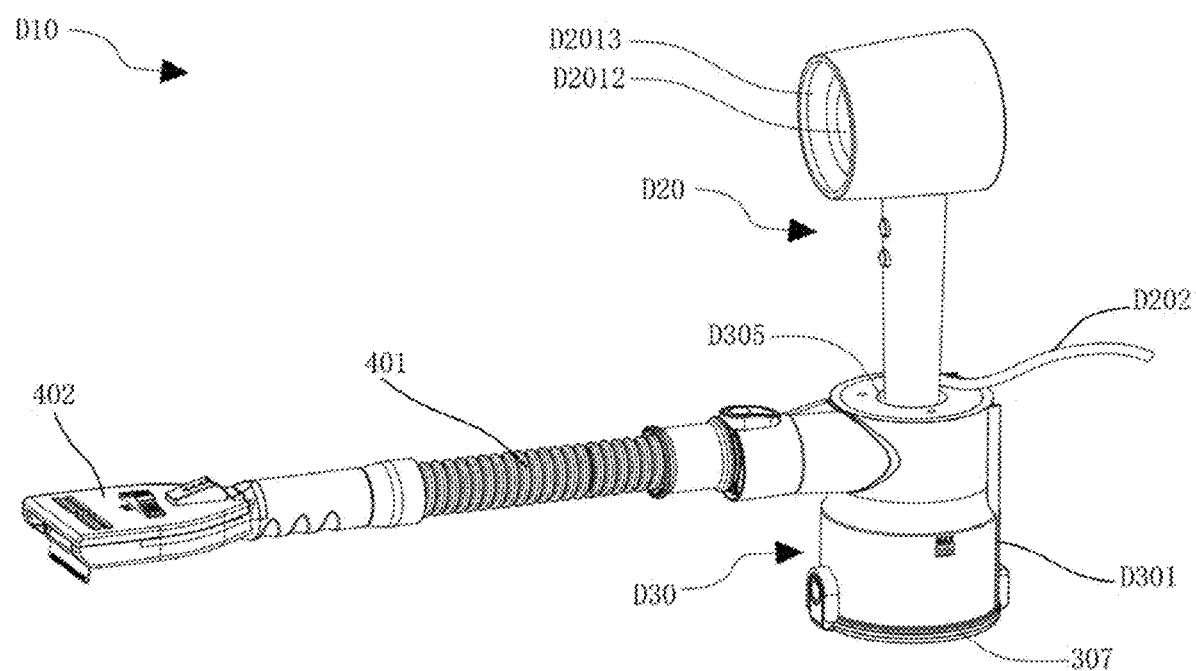
FIG. 14 is a schematic view of pet grooming machine in combined configuration in embodiment 4.
Figure 15:
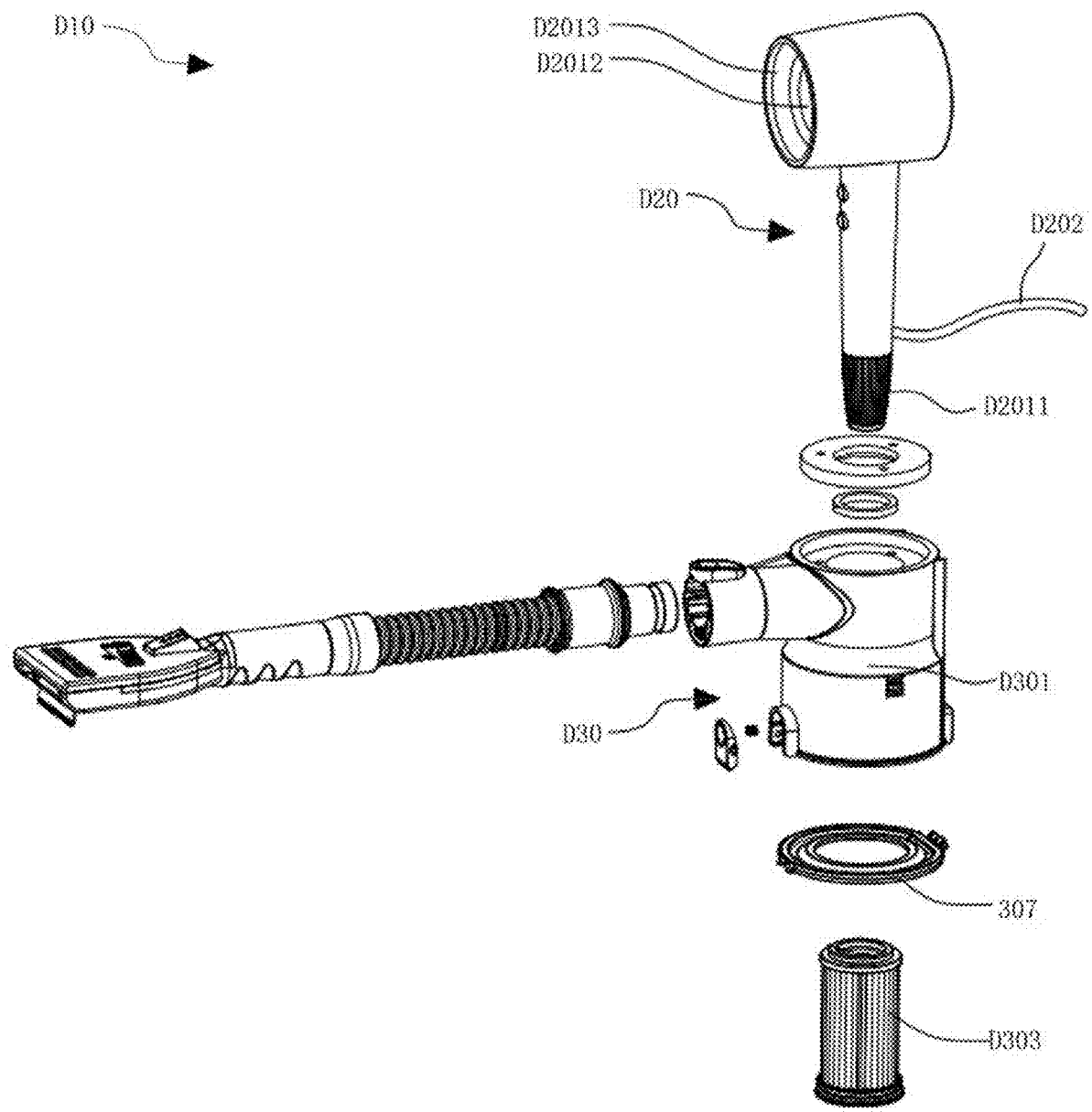
FIG. 15 is a exploded view of embodiment 4.
Figure 16:
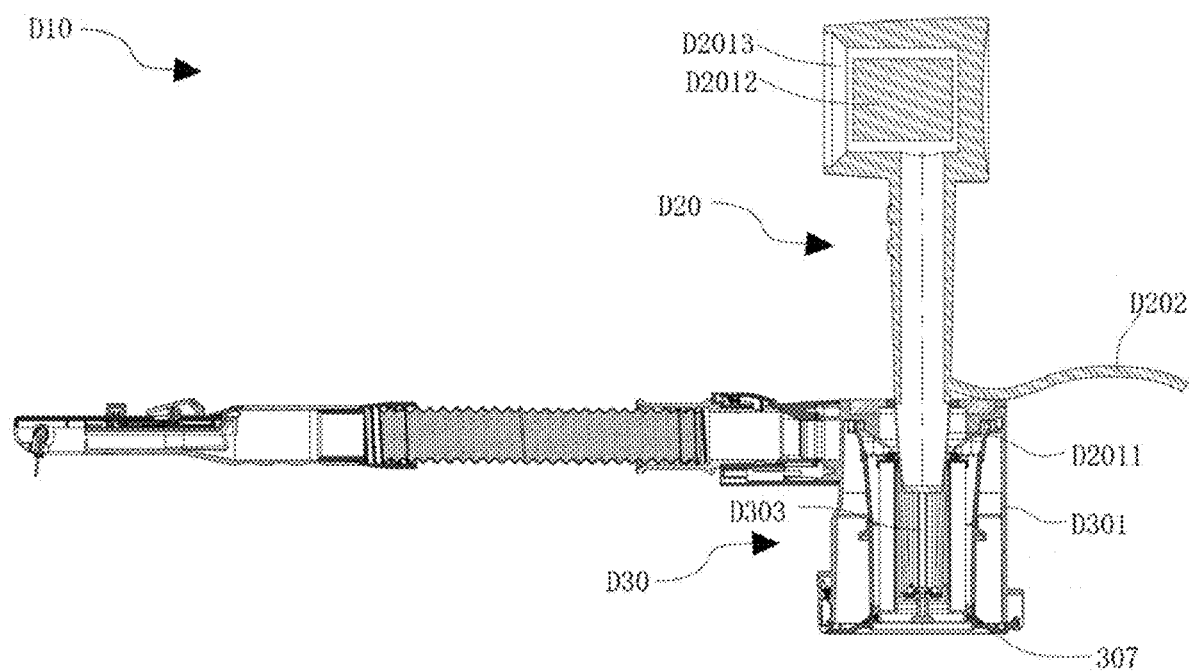
FIG. 16 is a sectional view of embodiment 4.

FIG. 14 is a schematic view of the pet grooming machine in the combined configuration in embodiment 4, FIG. 15. is an exploded view of embodiment 4, and FIG. 16 is a sectional view of embodiment 4.

As shown in FIG. 14 to FIG. 16, in embodiment 4, the pet grooming machine D10 comprises a portable blower D20 and a tank unit D30. The structure of the tank unit 30 is the same as in embodiment 1, so it will not be described in detail herein.

The blower main body of the portable blower D20 is in T-shape, comprises a vertical part (i.e., a handle) and a horizontal part (i.e., a blower tube) which are in fluid connection. The blower air-outlet D2013 is set on the blower tube, and inside the blower tube, there is a high-speed brushless motor unit D2012.

The blower air-inlet D2011 is set in the bottom of a hollow handle, a channel inside the blower tube and the handle are in fluid connection and forms an air channel connecting the blower air-outlet D2013 and the blower air-inlet D2011. The power cord D202 extends outwardly from the handle for connection to a power source, as shown in FIG. 15. The power cord D202 is vertical to the handle and reaches the high-speed brushless motor unit D2012 through wires inside the handle.

Filter D303 comprises a high efficiency fabric surrounding an internal cavity. On the top of the tank D301, there is an air-outlet D305 which matches the outlet-air guiding case. When the handle is connected to the tank unit D301 in a sealed manner, the bottom of the handle extends into internal cavity through the air-outlet D305 into the outlet-air guiding case and, the blower air-inlet D2011 connects with the internal cavity of the filter in a sealed manner.

A circular skirt-sleeve (not shown in figures) is set on the handle, when the portable blower D20 and the tank unit D30 is in combined configuration, the seal ring adjacent to the air-outlet D305 fits tightly with the pits on the circular skirt-sleeve in a sealed manner.

A rechargeable battery pack can be set inside the handle for maneuverability and making it a cordless portable blower.

Embodiments described herein are preferred cases and shall not be used to limit the protection scope of the present invention.

For example, in order to quickly dry pet hair, the motor of the portable blower in embodiments described herein are high-speed brushless motors for obtaining maximum airflow and the lowest noise. If user does not care much about the blowing and vacuuming efficiencies, a regular brushed motor can also be used, with bigger impeller and slower rotating speed, which makes the pet grooming machine larger and noisier with a lower vacuuming and blowing efficiency, but it can still work in some extent.

The suction motor in embodiment 3 can also be of a wet and dry type. In the combined configuration of the portable blower and tank unit, the suction nozzle can take wet hair from the pet body, the teeth on the suction nozzle can squeeze some water off from the wet pet fur and a suction airflow can vacuum water vapors into tank unit to reduce the humidity, thereby reducing the drying time for a large dog.

In this case, when grooming a pet, the user can firstly put the tank unit and portable blower in the combined configuration and vacuum dry the fur on the pet body with a suction nozzle extending from the tank unit, then wash the pet. Thereafter, use a proper suction nozzle on the wet pet body to squeeze the water off the wet fur while combing and vacuuming water vapors into the tank unit to reduce humidity. Then, finally take the portable blower away from the tank unit and keep both in the separated configuration to blow-dry the wet fur with the portable blower.

The invention claimed is:

1. A pet grooming machine, comprising:
   a blower comprising at least a blower main body and a power cord, said blower main body comprises at least: a blower air-inlet, a motor unit, a blower air-outlet, and an air channel in communication with said blower air-outlet and said blower air-inlet;
   a tank unit comprising at least a tank, a tank air-inlet, a filter and an air-outlet, said tank air-inlet is provided on said tank, and said filter is mounted inside said tank to receive and intercept hairs and other dust;
   wherein said blower and said tank unit can be in two configurations: a separated configuration and a combined configuration;
   wherein in said separated configuration, said blower is separated from said tank unit, and said blower can be independently used for blowing;
   wherein in said combined configuration, said blower air-inlet and said tank unit are detachably connected in a sealed manner such that when said motor unit of the blower main body is started in said combined configuration, a negative pressure generated by an airflow driven by said blower main body is transmitted to said tank air-inlet through said tank and said filter; and
   wherein said blower is a portable blower which can be held with a single hand by a user for blowing on a pet without a need for a flexible hose, and the user can turn a user's wrist to transmit air to different positions on a pet body to dry pet hairs.

2. The pet grooming machine of claim 1, wherein:
   said motor unit comprises at least a motor and a printed circuit board (PCB) separated from said motor;
   said tank unit further comprises an outlet-air guiding case, said outlet-air guiding case being located downstream of said filter;
   wherein in said combined configuration, said blower air-inlet extends into said outlet-air guiding case, said blower main body being detachably connected to said tank unit in a sealed manner, the negative pressure generated by the airflow driven by said blower main body is transmitted to said tank air-inlet through said outlet-air guiding case, said filter and said tank;
   wherein said air-outlet located downstream of an air channel inside said tank unit, the airflow enters the air channel inside said tank from said tank air-inlet, passes through said filter, flows through said outlet-air guiding case, and then exits from said tank unit through said air-outlet; and wherein in said combined configuration, at least a part of said motor unit is located inside said outlet-air guiding case.

3. The pet grooming machine of claim 2, wherein in said combined configuration, a part of said motor is located inside said outlet-air guiding case.

4. The pet grooming machine of claim 2, wherein said PCB is located the air channel of said blower, upstream of said motor; and wherein in said combined configuration, a part of said PCB is located inside said outlet-air guiding case.

5. The pet grooming machine of claim 2, wherein in said combined configuration, both said motor and said PCB are located inside said outlet-air guiding case.

6. The pet grooming machine of claim 2, wherein said filter is in a form of a cylinder, an inner surface of said filter encloses a cavity, and the cavity forms at least a part of said outlet-air guiding case; and wherein in said combined configuration, said at least said part of said motor unit is located inside said cavity enclosed by said filter.

7. The pet grooming machine of claim 2, wherein said blower main body further comprises a heating coil, said heating coil is provided downstream of said motor unit, and a temperature of the airflow blown out from said blower air-outlet does not exceed 80° C.

8. The pet grooming machine of claim 1, wherein said blower main body further comprises a handle and a blower tube in a fluid connection with said handle, said blower tube comprises said blower air-outlet, said blower tube further comprises said motor unit, said blower air-inlet is set on said handle, the air channel of said blower is inside said blower tube and said handle; and wherein said tank unit and said handle can be detachably connected in a sealed manner.

9. The pet grooming machine of claim 8, wherein said blower air-inlet is in a bottom part of said handle; wherein said filter comprises a fabric surrounding an internal cavity; wherein said air-outlet is set on top of said tank unit, matching said internal cavity, and wherein when said handle is connected to said tank unit in the sealed manner, the bottom part of said handle extends into said internal cavity through said air-outlet and, said blower air-inlet connects with said internal cavity in a sealed manner.

10. The pet grooming machine of claim 8, wherein said handle comprises a rechargeable battery pack therein.

11. The pet grooming machine of claim 1, wherein said motor unit is a high-speed brushless motor unit and said motor is a high-speed brushless motor with at least 80,000 rpm.

12. The pet grooming machine of claim 1, wherein said motor unit comprises two motors: a blowing motor and a suction motor.

13. The pet grooming machine of claim 12, wherein said blowing motor and said suction motor are controlled by a same power switch; wherein in said combined configuration, said power switch can only start said suction motor; and wherein in said separated configuration, said power switch can only start said blowing motor.

14. The pet grooming machine of claim 12, wherein each of said blowing motor and said suction motor is a high-speed brushless motor with at least rpm.

15. A method for pet hair grooming, comprising:
utilizing the pet grooming machine of claim 1 for pet hair grooming;
when drying wet pet hair, operating said portable blower alone, in the separated configuration with said tank unit, to blow the wet pet hair;
when vacuuming loose hairs and dust, operating said portable blower, in the combined configuration with said tank unit, to generate the negative pressure at said tank air-inlet, to vacuum the loose hairs and dust from pet through the flexible hose and a suction nozzle.

16. The method of claim 15, wherein said blower main body further comprises a heating coil, said heating coil is provided downstream of said motor unit, and a temperature of the airflow blown out from said blower air-outlet does not exceed and wherein upon a completion of vacuuming, operating said portable blower in the separated configuration with said tank unit and operating said heating coil to blow a hot air into said tank air-inlet with said portable blower to kill fleas, ticks and other parasites in the loose hairs inside said tank.

17. The method of claim 16, wherein when blowing the hot air into said tank air-inlet with said portable blower, reducing a ventilation area of said air-outlet to slow down the airflow from said tank unit to induce a temperature inside said tank unit to reach 60° C. in order to kill the fleas, ticks and other parasites in the loose hairs inside said tank.

18. The method of claim 15, wherein said portable blower comprises a wet and dry motor as a suction motor, after washing pet, operating said tank unit and said portable blower in said combined configuration, using the suction nozzle on a wet pet body to squeeze water off a wet fur while combing and vacuuming to transfer water vapors into said tank unit to reduce a humidity, then removing said portable blower from tank unit and operating said tank unit and said portable blower in said separated configuration to blow-dry the wet fur with said portable blower.

\* \* \* \* \*